(12) United States Patent
Satake et al.

(10) Patent No.: US 9,989,675 B2
(45) Date of Patent: Jun. 5, 2018

(54) POLARIZING PLATE AND IMAGE DISPLAY DEVICE

(71) Applicant: FUJIFILM Corporation, Tokyo (JP)

(72) Inventors: Ryo Satake, Kanagawa (JP); Megumi Sekiguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/082,738

(22) Filed: Mar. 28, 2016

(65) Prior Publication Data

US 2016/0209552 A1 Jul. 21, 2016

Related U.S. Application Data

(63) Continuation of application No. PCT/JP2014/075243, filed on Sep. 24, 2014.

(30) Foreign Application Priority Data

Sep. 30, 2013 (JP) .................................. 2013-203811

(51) Int. Cl.
*G02B 1/14* (2015.01)
*G02B 5/30* (2006.01)
(Continued)

(52) U.S. Cl.
CPC .................. *G02B 1/14* (2015.01); *B32B 7/02* (2013.01); *B32B 7/12* (2013.01); *G02B 5/3033* (2013.01);
(Continued)

(58) Field of Classification Search
CPC .............................. G02B 1/14; G02B 5/3033
See application file for complete search history.

(56) References Cited

U.S. PATENT DOCUMENTS

2007/0231566 A1 * 10/2007 Yoneyama ............. G02B 1/105
428/331
2009/0061114 A1    3/2009 Ando
(Continued)

FOREIGN PATENT DOCUMENTS

JP   2006-106714 A   4/2006
JP   2006-297914 A   11/2006
(Continued)

OTHER PUBLICATIONS

Machine_English_Translation_JP_2010044211_A; Matano, Hitoshi; Polarizing Plate and Image Display Device Using the Same; Feb. 25, 2010; JPO; whole document.*
(Continued)

*Primary Examiner* — Tahseen N Khan
(74) *Attorney, Agent, or Firm* — Edwards Neils LLC; Jean C. Edwards, Esq.

(57) ABSTRACT

A polarizing plate includes, in the following order, a pressure sensitive adhesive layer, a polarizer, and an outer side layer provided on a visible side rather than the polarizer side, the thickness of the outer side layer is >3 μm and ≤45 μm, the storage elastic modulus of the adhesive layer after lamination is 0.1 MPa to 2.0 MPa, and a hardness ratio (X/Y) is less than 1, when in measuring the hardness of the outer side layer in a depth direction at intervals of 1.5 μm from surface A thereof to a surface B on the polarizer side, the absolute value of the difference between an n-th and n+1 measured hardness (where n is an integer of 1 or more) is defined as the hardness difference (X), and the absolute value of the difference between the hardness of surface A and surface B is hardness difference (Y).

6 Claims, 1 Drawing Sheet

(51) Int. Cl.
  *B32B 7/02* (2006.01)
  *B32B 7/12* (2006.01)
  *G02F 1/1335* (2006.01)
  *G02B 1/115* (2015.01)

(52) U.S. Cl.
  CPC .... *G02F 1/133528* (2013.01); *B32B 2307/42* (2013.01); *B32B 2307/51* (2013.01); *B32B 2457/20* (2013.01); *B32B 2457/202* (2013.01); *B32B 2457/206* (2013.01); *G02B 1/115* (2013.01); *G02F 2201/50* (2013.01); *G02F 2202/28* (2013.01)

(56) References Cited

U.S. PATENT DOCUMENTS

| | | | | |
|---|---|---|---|---|
| 2009/0305068 | A1* | 12/2009 | Morishita | C09J 9/02 428/483 |
| 2011/0043733 | A1 | 2/2011 | Suzuki et al. | |
| 2012/0015169 | A1* | 1/2012 | Ohta | B29D 11/00865 428/216 |
| 2013/0098524 | A1 | 4/2013 | Suzuki et al. | |
| 2013/0126085 | A1 | 5/2013 | Suzuki et al. | |

FOREIGN PATENT DOCUMENTS

| | | |
|---|---|---|
| JP | 2010-009027 A | 1/2010 |
| JP | 2010-044211 A | 2/2010 |
| JP | 2010044211 A * | 2/2010 |
| WO | 2006/101251 A1 | 9/2006 |
| WO | 2010/113547 A1 | 10/2010 |

OTHER PUBLICATIONS

International Preliminary Report on Patentability issued by WIPO dated Apr. 14, 2016, in connection with International Patent Application No. PCT/JP2014/075243.

International Search Report issued in PCT/JP2014/075243 dated Dec. 16, 2014.

Office Action issued by the Japanese Patent Office dated Jan. 17, 2017, in connection with Japanese Patent Application No. 2015-539248.

Office Action issued by the Japanese Patent Office dated Sep. 27, 2016, in connection with Japanese Patent Application No. 2015-539248.

* cited by examiner

POLARIZING PLATE AND IMAGE DISPLAY DEVICE

CROSS-REFERENCE TO RELATED APPLICATIONS

This application is a continuation of International Application No. PCT/JP2014/075243 filed on Sep. 24, 2014, which was published under PCT Article 21(2) in Japanese, and which claims priority under 35 U.S.C. § 119(a) to Japanese Patent Application No. 2013-203811 filed on Sep. 30, 2013. The above applications are hereby expressly incorporated by reference, in their entirety, into the present application.

BACKGROUND OF THE INVENTION

1. Field of the Invention

The present invention relates to a polarizing plate and an image display device.

2. Description of the Related Art

Generally, a polarizing plate formed by laminating a transparent protective film for a polarizer using triacetylcellulose or the like to one surface or both surfaces of a polarizer made of a polyvinyl alcohol film and a dichroic material such as iodine with a polyvinyl alcohol adhesive has been used.

When a polarizing plate is attached (laminated) to a liquid crystal cell, typically, a pressure sensitive adhesive is used. The pressure sensitive adhesive is provided as a pressure sensitive adhesive layer on one surface of the polarizing plate in advance since the pressure sensitive adhesive is advantageous in that the polarizing plate can be fixed instantly and a dry process is not required to fix the polarizing plate.

Further, in recent years, a polarizing plate in which a transparent protective film is provided on only one surface of a polarizer and a pressure sensitive adhesive layer is provided on the other surface of the polarizer from the viewpoint of thickness reduction has been used.

For example, JP2010-009027A discloses a pressure sensitive adhesive polarizing plate which has a transparent protective film provided on only one surface of a polarizer and a pressure sensitive adhesive layer provided on the other surface thereof, the pressure sensitive adhesive polarizing plate satisfying durability even under a severe environment at a low temperature or a high temperature ("0007"). As the pressure sensitive adhesive polarizing plate, a "pressure sensitive adhesive polarizing plate that has a transparent protective film (E) provided on only one surface of a polarizer (P) through an adhesive layer (G) and a pressure sensitive adhesive layer (B) provided on the other surface of the polarizer (P) through a protective layer (H) having a tension elastic modulus of 100 MPa or more" is disclosed ("Claim 1").

SUMMARY OF THE INVENTION

When the present inventors have investigated the pressure sensitive adhesive polarizing plate disclosed in JP2010-009027A, it has been found that the hardness of the polarizing plate is deteriorated in some cases according to the hardness of the pressure sensitive adhesive layer after being laminated on a display element and the thickness of the transparent protective film present on a visible side rather than on the polarizer side or the like (hereinafter, referred to as a "outer side layer").

Here, an object of the present invention is to provide a polarizing plate capable of maintaining a high degree of hardness even in the case in which the thickness of the outer side layer is reduced, and an image display device using the same.

As a result of intensive investigations to achieve the above object, the present inventors have found that even in the case in which the outer side layer of the polarizing plate is a thin film having a thickness of more than 3 μm and equal to or less than 45 μm, a high degree of hardness can be maintained by designing a polarizing plate such that the hardness of the pressure sensitive adhesive layer is set to be within a specific range after lamination, and by defining a relationship between the hardness (distribution) of the outer side layer in a depth direction and a hardness difference between the surface (visible side) of the outer side layer and the rear surface thereof (polarizer side). Thus, the present invention has been completed.

That is, it has been found that the above object can be achieved by employing the following configurations.

[1] A polarizing plate including, in the following order, a pressure sensitive adhesive layer, a polarizer, and an outer side layer provided on a visible side rather than on a polarizer side, in which the thickness of the outer side layer is more than 3 μm and equal to or less than 45 μm, the storage elastic modulus of the pressure sensitive adhesive layer after lamination is 0.1 MPa to 2.0 MPa, and when in the measurement of the hardness of the outer side layer in a depth direction at intervals of 1.5 μm from a surface A of the outer side layer on the opposite side of a side on which the polarizer is provided to a surface B of the outer side layer on a side on which the polarizer is provided, an absolute value of a difference between an n-th measured hardness and an n+1-th measured hardness is defined as a hardness difference X, and an absolute value of a difference between the hardness of the outer side layer at the surface A and the hardness of the outer side layer at the surface B is defined as a hardness difference Y, a ratio between the hardness difference X and the hardness difference Y is smaller than 1, and n represents an integer of 1 or more and the ratio refers to a ratio of the hardness difference X to the hardness difference Y.

[2] The polarizing plate according to [1], in which the outer side layer includes, in the following order, from the visible side, a hard coat layer and a protective layer, and a mixed layer in which a constituent material of the hard coat layer and a constituent material of the protective layer are mixed is provided between the hard coat layer and the protective layer.

[3] The polarizing plate according to [1], in which the outer side layer includes a mixed layer in which a constituent material of a hard coat layer and a constituent material of a protective layer are mixed.

[4] The polarizing plate according to [1] or [2], in which a ratio between the thickness of the protective layer and the thickness of the mixed layer is 2 or more, and the ratio refers to a ratio of the thickness of the protective layer to the thickness of the mixed layer.

[5] An image display device including the polarizing plate according to any one of [1] to [4], and a display element.

According to the present invention, it is possible to provide a polarizing plate capable of maintaining a high degree of hardness even in the case in which the thickness of an outer side layer is reduced, and an image display device using the same.

DESCRIPTION OF THE PREFERRED EMBODIMENTS

Figure 1:
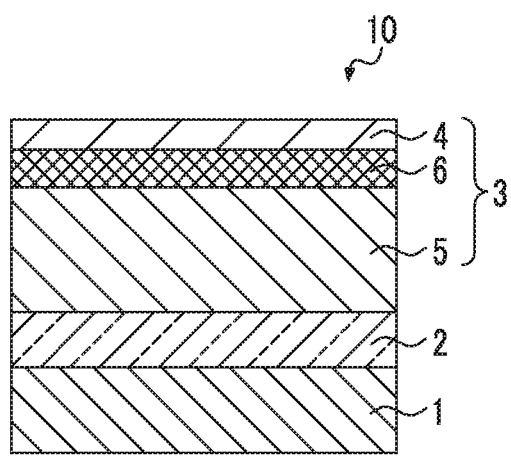
FIG. 1 is a cross-sectional view schematically showing an example of a polarizing plate according to the present invention.

Hereinafter, the present invention will be described in detail.

The description of configuration requirements described below may be based on typical embodiments of the invention, but the invention is not limited to the embodiments, In the specification, numeric ranges expressed using "to" include numeric values described before and after "to" as the lower limit value and the upper limit value.

[Polarizing Plate]

A polarizing plate of the present invention is a polarizing plate that includes, in the following order, a pressure sensitive adhesive layer, a polarizer and an outer side layer provided on a visible side rather than on the polarizer side, in which the thickness of the outer side layer is more 3 μm and equal to or less than 45 μm, the storage elastic modulus of the pressure sensitive adhesive layer after lamination is 0.1 MPa to 2.0 MPa, when in the measurement of the hardness of the outer side layer in a depth direction at intervals of 1.5 μm front a surface A of the outer side layer on the opposite side of a side on which the polarizer is provided (hereinafter, simply referred to as "surface A") to a surface B of the outer side layer on a side on which the polarizer is provided (hereinafter, simply referred to as "surface B"), an absolute value of a difference between an n-th measured hardness (herein, n represents an integer of 1 or more) and an n+1-th measured hardness is defined as a hardness difference (X), and an absolute value of a difference between the hardness of the outer side layer at the surface A and the hardness of the outer side layer at the surface B is defined as a hardness difference (Y), and a ratio (X/Y) between the hardness difference (X) and the hardness difference (Y) is smaller than 1.

Herein, the expression "the hardness of the outer side layer in a depth direction" can be measured by an indentation method using an atomic force microscope (AFM) (AFM indentation method), and in the present invention, the hardness refers to a value calculated from the depth of impression that can be confirmed when using an AFM (SPA400, manufactured by SII Nanotechnology) with a Bercovici indenter made of diamond, the Bercovici indenter is pressed against the cross section of the outer side layer, obtained by cutting the outer side layer using a microtome, with a load of 400 N/m, and then the Bercovici indenter is pulled out.

The expression "the hardness of the outer side layer in a depth direction" refers to a hardness which does not include the hardness of the outer side layer at the surface A and the surface B and is measured at intervals of 1.5 μm from the surface A to the surface B in the depth direction.

In addition, the expression "the hardness of the outer side layer at the surface A" refers to the hardness at the surface A measured under the same conditions as the measurement conditions of the above-mentioned expression "the hardness of the outer side layer in a depth direction", and the expression "the hardness of the outer side layer at the surface B" refers to the hardness at the surface B measured under the same conditions as the measurement conditions of the above-mentioned expression "the hardness of the outer side layer in a depth direction" after the outer side layer is peeled off from the polarizer to expose the surface B of the outer side layer.

Further, the expression "a ratio (X/Y) between the hardness difference (X) and the hardness difference (Y) is smaller than 1" indicates that, for example, in the case in which the outer side layer is formed of plural layers (for example, a hard coat layer, a protective layer and the like, which will be described later), the hardness difference between each layer is smaller than the hardness difference between the surface (surface A) of the hard coat layer and the surface (surface B) of the protective layer near the boundary between the hard coat layer and the protective layer, and is a definition meaning that, for example, in the case in which the outer side layer is formed of plural layers, a hardness distribution is present between each layer. In the case in which the outer side layer is formed of a single layer (for example, only a hard coat layer), the ratio (X/Y) is 0, which is smaller than 1.

In addition, the expression "the storage elastic modulus of the pressure sensitive adhesive layer after lamination" refers to the storage elastic modulus of the pressure sensitive adhesive layer in a state in which an image display device is formed and refers to a storage elastic modulus, for example, after the pressure sensitive adhesive layer is laminated on a liquid crystal cell and then a pressure sensitive adhesive is cured in practical use as required.

In the present invention, the expression "the storage elastic modulus of the pressure sensitive adhesive layer after lamination" refers to a storage elastic modulus obtained in such a manner that the pressure sensitive adhesive layer (in the analysis of an image display device, a pressure sensitive adhesive layer cut out from the image display device) is used to prepare a columnar test piece having a diameter of 8 mm and a thickness of 1 mm and the storage elastic modulus of the test piece is measured at 23° C. using a measuring device "DYNAMIC ANARYZER RDA II", manufactured by Rheometric Scientific F.E., at a frequency of 1 Hz by a twisting shearing method.

Even in the case in which the thickness of the outer side layer in the polarizing plate having such a configuration according to the present invention is reduced, a high degree of hardness can be maintained.

Although the details are not clear, the present inventors presume as follows.

That is, since the ratio (X/Y) between the hardness difference (X) and the hardness difference (Y) is smaller than 1, the hardness in a thickness direction rarely changes in an embodiment having a hard coat layer and a protective layer, which will be described later, and an embodiment using only a hard coat layer, which will be described later. Even in the case in which the hardness changes, the change is gentle and thus it is considered that stress applied to a layer having a relatively low hardness can be gently absorbed.

In the present invention, from the viewpoint of effective stress absorption and ease of design, the above-mentioned ratio (X/Y) between the hardness difference (X) and the hardness difference (Y) is preferably 0.05 to 0.8 and more preferably 0.2 to 0.6.

FIG. 1 is a cross-sectional view schematically showing an example of an embodiment of a polarizing plate according to the present invention.

A polarizing plate 10 shown in FIG. 1 includes a pressure sensitive adhesive layer 1, a polarizer 2, and an outer side layer 3 provided on a visible side rather than a side close to the polarizer 2.

In addition, the polarizing plate of the present invention may include a hard coat layer 4 and a protective layer 5 as the outer side layer as shown in FIG. 1 and a mixed layer 6 in which a constituent material of the hard coat layer and a constituent material of the protective layer are mixed may be provided between the hard coat layer 4 and the protective layer 5.

Hereinafter, each layer constituting the polarizing plate of the present invention will be described in detail.

[Pressure Sensitive Adhesive Layer]

The pressure sensitive adhesive layer included in the polarizing plate of the present invention is a layer provided for laminating the polarizing plate of the present invention on a liquid crystal cell.

The pressure sensitive adhesive layer is not particularly limited as long as the storage elastic modulus after the pressure sensitive adhesive layer is laminated on a liquid crystal cell is 0.10 MPa to 2.0 MPa. For example, a known pressure sensitive adhesive in the related art can be appropriately selected and used.

Further, the above-mentioned storage elastic modulus of the pressure sensitive adhesive layer is preferably 0.15 MPa to 1.8 MPa from the viewpoint of not easily causing cracks and peeling and easily preventing a dimensional change in a liquid crystal cell.

Examples of the pressure sensitive adhesive include rubber pressure sensitive adhesives, acrylic pressure sensitive adhesives, silicone pressure sensitive adhesives, urethane pressure sensitive adhesives, vinyl alkyl ether pressure sensitive adhesives, polyvinyl alcohol pressure sensitive adhesives, polyvinyl pyrrolidone pressure sensitive adhesives, polyacrylamide pressure sensitive adhesives, and cellulose pressure sensitive adhesives.

Among these, from the viewpoint of transparency, weather resistance, heat resistance, and the like, acrylic pressure sensitive adhesives are preferable.

The pressure sensitive adhesive layer can be formed by, for example, a method of applying a pressure sensitive adhesive solution to a peeling sheet, drying the pressure sensitive adhesive solution, and then transferring the pressure sensitive adhesive layer to the surface (one surface) of a polarizer; a method of directly applying a pressure sensitive adhesive solution to the surface of a polarizer and drying the pressure sensitive adhesive solution; and the like.

For example, the pressure sensitive adhesive solution is prepared as a solution in which a pressure sensitive adhesive is dissolved or dispersed in a solvent such as toluene or ethyl acetate in an amount of about 10% by mass to 40% by mass.

For the coating method, reverse coating, roll coating such as gravure coating or the like, spin coating, screen coating, fountain coating, dip coating, and spray coating can be adopted.

Examples of the constituent material of the peeling sheet include appropriate thin sheets such as synthetic resin films of polyethylene, polypropylene, and polyethylene terephthalate; rubber sheets; paper; fabrics; non-woven fabrics; nets; foamed sheets; and metal foils.

In the present invention, the thickness of the pressure sensitive adhesive layer is not particularly limited and is preferably 3 μm to 50 μm, more preferably 4 μm to 40 μm, and even more preferably 5 μm to 30 μm.

[Polarizer]

The polarizer included in the polarizing plate of the present invention is not particularly limited and various polarizers can be used.

Examples of the polarizer include a polarizer obtained by making a hydrophilic polymer film such as a polyvinyl alcohol film, a partially formalized polyvinyl alcohol film, or a partially saponified ethylene-vinyl acetate copolymer film adsorb a dichroic material such as iodine, or a dichroic dye and uniaxially stretching the film; and a polyene-aligned film such as polyvinyl alcohol dehydrate or polyvinyl chloride dehydrochlorinate.

Among these, a polarizer formed of a polyvinyl alcohol film and a dichroic material such as iodine is preferable.

In the present invention, the thickness of the polarizer is not particularly limited and is preferably 3 μm to 60 μm, more preferably 5 μm to 30 μm, and even more preferably 5 μm to 15 μm.

[Outer Side Layer]

The outer side layer included in the polarizing plate of the present invention has a thickness (in the case in which the polarizing plate includes a hard coat layer, a protective layer and a mixed layer, which will be described later, the total thickness of these layers) of more than 3 μm and equal to or less than 45 μm and as long as the outer side layer has a ratio (X/Y) between the hardness difference (X) and the hardness difference (Y) of smaller than 1, which has been defined in the above description, the outer side layer is not particularly limited.

In the polarizing plate of the present invention, as described above, the ratio (X/Y) between the hardness difference (X) and the hardness difference (Y) is smaller than 1 and even in the case in which the thickness of the outer side layer is reduced, a high degree of hardness can be maintained.

In the present invention, the above-described outer side layer may be formed of a single layer (for example, formed of only a hard coat layer). However, because of ease of a further thickness reduction while maintaining a high degree of hardness, an outer side layer in which a hard coat layer and a protective layer are provided in this order from a visible side and a mixed layer in which a constituent material of the hard coat layer and a constituent material of the protective layer are mixed is provided between the hard coat layer and the protective layer, and an outer side layer in which a hard coat layer and a protective layer are not provided and only a mixed layer in which a constituent material of the hard coat layer and a constituent material of the protective layer are mixed is provided are preferable.

Here, although the reason why the above-mentioned reason is exhibited is not clear, in the above-described mixed layer, the components of the hard coat layer and the components of the protective layer are entangled with each other so as to fill respective voids. As a result, the structure becomes denser and it is considered that the hardness is increased compared to an embodiment in which a mixed layer is not provided.

<Hard Coat Layer>

The above-mentioned hard coat layer is a layer mainly provided for imparting a physical strength to the polarizing plate.

The hard coat layer is preferably formed by a crosslinking reaction or a polymerization reaction of an ionizing radiation curable compound.

For example, a coating composition including an ionizing radiation curable polyfunctional monomer or polyfunctional oligomer is applied, to the protective layer, which will be described later and the polyfunctional monomer or polyfunctional oligomer is crosslinked or polymerized to form a hard coat layer.

As a functional group for the ionizing radiation curable polyfunctional monomer or polyfunctional oligomer, a photopolymerizable functional group, an electron beam polymerizable functional group, and a radiation polymerizable functional group are preferable and among these, a photopolymerizable functional group is more preferable.

Examples of the photopolymerizable functional group include unsaturated polymerizable functional groups such as a (meth)acryloyl group, a vinyl group, a styryl group, and an allyl group. Among these, a (meth)acryloyl group is preferable.

In the present invention, the thickness of the hard coat layer is not particularly limited as long as the thickness of the outer side layer is more than 3 μm and equal to or less than 45 μm and is preferably 4 μm to 20 μm and more preferably 5 μm to 15 μm.

In addition, for the purpose of imparting internal scattering to the hard coat layer, the hard coat layer may contain mat particles having an average particle diameter of 1.0 μm to 10.0 μm, and preferably having an average particle diameter of 1.5 μm to 7.0 μm, for example, inorganic compound particles or resin particles.

Similarly, as a binder for the hard coat layer, for the purpose of controlling the refractive index of the hard coat layer, high refractive index monomers, inorganic particles, or both can be added to the hard coat layer. The inorganic particles have an effect of controlling a refractive index and also have an effect of suppressing curing shrinkage due to a crosslinking reaction. In the present invention, the binder includes inorganic particles dispersed in a polymer formed by polymerization of the above-mentioned polyfunctional monomer or the like after the hard coat layer is formed.

<Protective Layer>

The protective layer is a layer mainly provided for protecting the polarizer.

Examples of the material for forming the protective layer include cellulose polymers; acrylic polymers having an acrylic ester polymer such as polymethyl methacrylate and a polymer having a lactone ring; thermoplastic norbornene polymers; polycarbonate polymers; polyester polymers such as polyethylene terephthalate and polyethylene naphthalate; styrene polymers such as polystyrene and an acrylonitrile-styrene copolymer (AS resin); polyolefin polymers such as polyethylene, polypropylene, and an ethylene-propylene copolymer; vinyl alcohol polymers; vinyl chloride polymers; amide polymers such as nylon and aromatic polyamide; imide polymers; sulfone polymers; polyether sulfone polymers; polyether ether ketone polymers; polyphenylene sulfide polymers; vinylidene chloride polymers; vinyl butyral polymers; allylate polymers; polyoxymethylene polymers; epoxy polymers; and blends of these polymers.

In addition, the protective layer can be formed as a cured layer of a thermosetting resin or an ultraviolet curing resin such as acrylic, urethane, acrylic urethane, epoxy, and silicone resins.

Among these, a cellulose polymer which has been used as a transparent protective film for a known polarizing plate in the related art and represented as triacetyl cellulose (hereinafter, also referred to as "cellulose acylate") can be preferably used.

In addition, from the viewpoint of workability and optical performance, an acrylic polymer is preferably used.

Examples of the acrylic polymer include polymethyl methacrylate and a polymer having a lactone ring described in paragraphs "0017" to "0107" of JP2009-98605A.

In the present invention, the above-described protective layer may contain at least one plasticizer together with the above-mentioned forming materials (particularly, cellulose acylate). However, since the plasticizer generally deteriorates the elastic modulus of the film, it is important to suitably select the type of the plasticizer to be used and adjust the amount of the plasticizer to be added. Adding a sugar ester and a polycondensate oligomer plasticizer in a small amount is preferable which contributes to increasing the tensile elastic modulus of the film. Among these, a sugar ester having an aromatic group and a polycondensate oligomer plasticizer are preferable and a sugar ester is more preferable. For example, when a cellulose acylate film containing a sugar ester is stretched (preferably stretched biaxially), the MD and TD tensile elastic modulus of the film can be increased to the above-described range. In addition, the sugar ester contributes to enhancing the adhesiveness of the cellulose acylate film to the hard coat layer.

Examples of the sugar ester include a sugar ester described in paragraphs "0022" to "0050" of JP2012-215812A.

In addition, in the present invention, a method of preparing the protective layer is not particularly limited and for example, the polymer film (particularly, cellulose acylate) can be prepared by various methods such as a solution casting method, a melting extrusion method, a calendering method, and a compression molding method.

Among these preparation methods, a solution casting method and a melting extrusion method are preferable and a solution casting method is particularly preferable. In addition, in the solution casting method, the film can be prepared using a solution (dope) obtained by dissolving cellulose acylate in an organic solvent. In the case of using the above-mentioned additive, the additive may be added at any time during the preparation of the dope.

Specifically, a method of preparing a cellulose acylate film described in paragraphs "0219" to "0224" of JP2006-184640A, a method of forming a polymer film using a solution described in paragraphs "0022" to "0046" and "0062" to "0088" and shown in drawings of JP2006-116936A, and the like can be referred to.

Further, in the present invention, the thickness of the protective layer is not particularly limited as long as the thickness of the outer side layer is more than 3 μm and equal to or less than 45 μm and is preferably 5 μm to 40 μm and more preferably 5 μm to 15 μm.

<Mixed Layer>

The above-described mixed layer is a layer in which the constituent material of the above-motioned hard coat layer and the constituent material of the above-mentioned protective layer are mixed.

In the present invention, as described above, in the case in which the outer side layer is formed of plural layers, the ratio (X/Y) between the hardness difference (X) and the hardness difference (Y), which is defined in the above description, can be set to be smaller than 1 by providing such a mixed layer.

Examples of the method of forming the mixed layer include a method of, when forming the hard coat layer on the surface of the protective layer on the visible side, incorporating an organic solvent for dissolving the protective layer, as a coating composition including an ionizing radiation curable polyfunctional monomer or polyfunctional oligomer, into the hard coat layer; and a method of laminating a film prepared by mixing cellulose acylate and a polyfunctional acrylic monomer or an oligomer and stretching and curing the mixture on the surface of the protective layer on the visible side.

Here, in the former method, some of the coating composition for forming the hard coat layer causes the surface of the protective layer to swell or dissolve and is mixed with the constituent components of the protective layer. Thus, when the hard coat layer is cured, the mixed layer is formed.

In such a former method, examples of the organic solvent include methyl ethyl ketone (MEK) and methyl acetate in the case in which a cellulose polymer is used as a material for forming the protective layer, and n-butyl cellosolve in the case in which an acrylic polymer is used as a material for forming the protective layer.

In the present invention, the thickness of the mixed layer is preferably 1 μm to 10 μm and more preferably 3 μm to 7 μm.

Particularly, the ratio between the thickness of the protective layer and the thickness of the mixed layer (protective layer/mixed layer) is preferably 2 or more, more preferably 2 or more and 30 or less, and even more preferably 3 or more and 20 or less because the hardness of the polarizing plate can be maintained to a higher degree.

<Other Layers>
(Antiglare Layer)

In the case in which the above-described outer side layer includes the above-mentioned hard coat layer, from the viewpoint of anti-glare characteristics by surface scattering and scratch resistance, the outer side layer may further include an antiglare layer on the surface of the hard coat layer on the visible side.

Known examples of the method of forming the antiglare layer include a method of forming the antiglare layer by laminating a mat shaped film having fine irregularities on its surface described in JP1994-16851A (JP-H06-16851A), a method of forming the antiglare layer by varying the irradiation dose of ionizing radiation and thereby bringing out curing shrinkage of an ionizing radiation curable resin described in JP2000-206317A, a method of decreasing the mass ratio of a good solvent for a light transparent resin through drying and thereby gelling and solidifying light transparent fine particles and a light transparent resin to form irregularities on the film coating surface described in JP2000-338310A, and a method of imparting surface irregularities by applying an external pressure described in JP 2000-275404A. These known methods can be utilized.

In the present invention, the polarizing plate is preferably used as a functionalized polarizing plate combined with an optical film having a functional layer such as an antireflection film and a luminance improving film for improving visibility of a display within a range not departing the purport of the invention. The details thereof can be referred to in the descriptions of paragraphs 0229 to 0242 and 0249 to 0250 of JP2012-082235A, and paragraphs 0086 to 0103 of JP2012-215812A and the contents thereof are incorporated in the specification of the application.

[Image Display Device]

An image display device of the present invention is an image display device including the above-mentioned polarizing plate of the present invention and a display element.

Herein, the display element used in the image display device of the present invention is not particularly limited and for example, a liquid crystal cell, an organic EL display panel, a plasma display panel, and the like can be used.

Among these, a liquid crystal cell and an organic EL display panel are preferably used, and a liquid crystal cell is more preferably used. That is, the image display device of the present invention is preferably an image display device using a liquid crystal cell as a display element and an image display device using an organic EL display panel as a display element, and is more preferably a liquid crystal display device.

[Liquid Crystal Display Device]

A liquid crystal display device as an example of the image display device of the present invention is a liquid crystal display device including the above-mentioned polarizing plate of the present invention and a liquid crystal cell.

In the present invention, it is preferable that the polarizing plate of the present invention is used for the polarizing plate on the front side between the polarizing plates provided on both sides of the liquid crystal cell and it is more preferable that the polarizing plate of the present invention is used for the polarizing plates on the front and rear sides.

Figure 2:
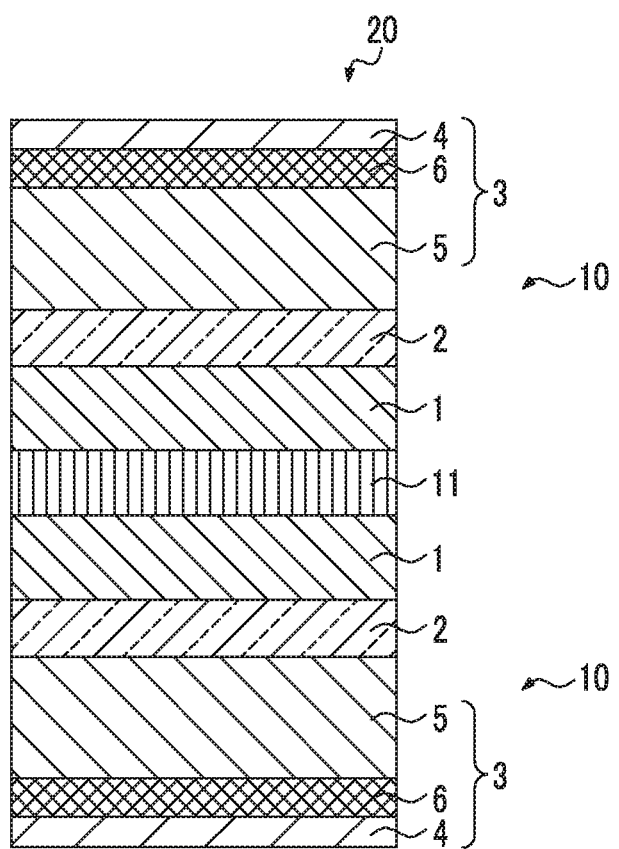
FIG. 2 is a cross-sectional view schematically showing an example of an image display device according to the present invention.

FIG. 2 is a cross-sectional view schematically showing an example of an embodiment of an image display device (liquid crystal display device) according to the present invention.

A liquid crystal display device 20 shown in FIG. 2 includes a liquid cell 11 and polarizing plates 10 provided on both sides of the liquid cell 11. The liquid crystal cell is provided for supporting a liquid crystal layer between two electrode substrates (not shown).

Hereinafter, the liquid crystal cell forming the liquid crystal display device will be described in detail.

<Liquid Crystal Cell>

The liquid crystal cell used in the liquid crystal display device is preferably a VA mode liquid crystal cell, an OCB mode liquid crystal cell, an IPS mode liquid crystal cell, or a TN mode liquid crystal cell but is not particularly limited thereto.

In the TN mode liquid crystal cell, rod-like liquid crystalline molecules are oriented substantially in the horizontal alignment when no voltage is applied and furthermore, twisted at an angle of 60° to 120°. The TN mode liquid crystal cell is most frequently utilized as a color TFT liquid crystal display device and described in a large number of publications.

In the VA mode liquid crystal cell, rod-like liquid crystalline molecules are oriented substantially in the vertical alignment at the time of not applying a voltage. The VA mode liquid crystal cell includes (1) a VA mode liquid crystal cell in a narrow sense where rod-like liquid crystalline molecules are oriented substantially in the vertical alignment when no voltage is applied and oriented substantially in the horizontal alignment when a voltage is applied (described in JP1990-176625A (JP-H02-176625A)); (2) an (MVA mode) liquid crystal cell where the VA mode is modified to a multi-domain system for enlarging the viewing angle (described in SID97, Digest of Tech. Papers (preprints), 28, 845 (1997)); (3) an (n-ASM mode) liquid crystal cell where rod-like liquid crystalline molecules are oriented substantially in the vertical alignment when no voltage is applied and oriented in the twisted multi-domain alignment when a voltage is applied (described in preprints of Nippon Ekisho Toronkai (Liquid Crystal Forum of Japan), 58-59 (1998)); and (4) a SURVAIVAL mode liquid crystal cell (reported in LCD International 98). In addition, any of a patterned vertical alignment (PVA) type liquid crystal cell, an optical alignment type liquid crystal cell and a polymer-sustained alignment (PSA) liquid crystal cell may be used.

The details of these modes are described in JP2006-215326A and JP2008-538819A.

In the IPS mode liquid crystal cell, rod-like liquid crystal molecules are aligned substantially parallel to a substrate and have in-plane response to application of an electric field parallel to the substrate surface. In the IPS mode liquid crystal cell, application of no electric field causes a black display state, and vertically paired polarizing plates have mutually orthogonal absorption axes. Methods for reducing slantwise light leakage in a black display state with an optically compensating sheet to enlarge a viewing angle are disclosed, for example, in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), and JP1998-307291A (JP-H10-307291A).

[Organic EL Display Device]

As the organic EL display device as an example of the image display device of the present invention, for example, an embodiment including, in the following order, from the visible side, the polarizing plate of the present invention, a plate having a λ/4 function (hereinafter, also referred to as a "λ/4 plate"), and an organic EL display panel is preferably used.

Herein, the term "plate having a λ/4 function" refers to a plate having a function of changing linearly polarized light having a specific wavelength to circularly polarized light (or circularly polarized light to linearly polarized light) and specific examples of a λ/4 plate having a single layer structure include a retardation film having an optically anisotropic layer having a λ/4 function provided on a stretched polymer film or a support. Specific examples of the λ/4 plate having plural layers structure further include a wide range λ/4 plate formed by laminating a λ/4 plate and a λ/2 plate.

In addition, the organic EL display panel is a display panel formed by using an organic EL element in which an organic light emitting layer (organic electroluminescent element layer) is interposed between electrodes (between a negative electrode and a positive electrode). The configuration of the organic EL display panel is not particularly limited and a known configuration is adopted.

EXAMPLES

The present invention will be more specifically described below based on Examples. The materials, amount used, ratios, treatment contents, treatment procedures and the like described in the following Examples can be appropriately varied or modified without departing from the purport of the present invention. Accordingly, it is to be understood that the scope of the present invention should not be interpreted as limited by specific examples shown below.

<Synthesis of Compound (U-1)>

25 g of 2-methylpentane-2,4-diol, 90 mg of n-dibutyltin diacetate, and 500 ml of THF were put into a 1 L three-neck flask, 52.9 g of phenyl isocyanate was added dropwise to the three-neck flask under ice cooling, and then the mixture was left to react at 40° C. for 2 hours.

Next, a white solid obtained by concentrating the reaction mixture and purifying the concentrate by silica gel column chromatography (solvent: ethyl acetate/n-hexane) was dried, thereby obtaining 40 g of a compound (U-1) represented by the following formula (yield rate: 53%).

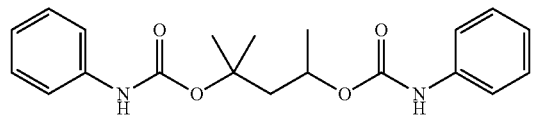 [SMILES: CC(CC(C)(C)OC(=O)Nc1ccccc1)OC(=O)Nc1ccccc1]

Examples 1 to 22 and 26 to 35 and Comparative Examples 1 to 14 and 18 to 25

(1) Preparation of Protective Layer

<Formation of Cellulose Acylate Films (TAC-1) to (TAC-4)>

(Preparation of Cellulose Acylate Solution T1)

The following composition was put into a mixing tank and stirred to dissolve each component, thereby preparing a cellulose acylate solution T1.

Composition of Cellulose Acylate Solution T1

Cellulose acetate having an acetyl substitution degree of 2.87 and a weight average molecular weight of 200,000: 100.0 parts by mass Compound (U-1) above: 2.0 parts by mass Additive (A-1) below: 5.8 parts by mass Additive (A-2) below: 1.8 parts by mass Methylene chloride (first solvent): 402.0 parts by mass Methanol (second solvent): 60.0 parts by mass As the additive (A-1), the following, compound was used. In the following structural formula, R represents a benzoyl group and a compound having an average substitution degree of 5 to 7 was used.

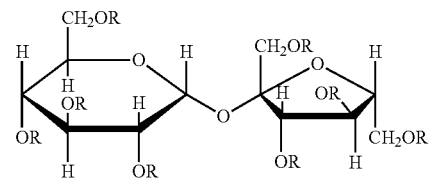

As the additive (A-2), the following compound was used (each structural formula and substitution degree of $R^9$ are as follows).

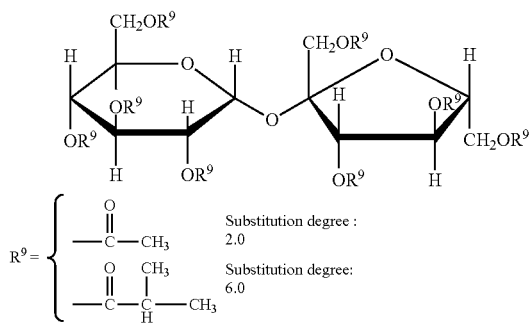

(Preparation of Acrylic Resin Solution P1)

Next, Dianal BR88 (manufactured by Mitsubishi Rayon Co., Ltd.) was dissolved in methylene chloride and methanol and the concentration was adjusted so as to have the same viscosity as the viscosity of the cellulose acylate solution T1, thereby preparing an acrylic resin solution P1.

(Formation of Co-Cast Film)

The cellulose acylate solution T1 and the acrylic resin solution P1 were used to form a solution cast film and a peelable laminated film having the configuration shown in Table 1 below was prepared.

Specifically, the solutions were cast through a casting die capable of two-layer co-casting such that the layer structure shown in Table 1 below was formed on a metal support.

At this time, a lower layer and an upper layer were cast in sequence from the surface side of the metal support and the viscosity of each layer was appropriately controlled through the adjustment of the solid content concentration depending on the combination of the respective dopes so as to enable even casting. Dry air at 40° C. was applied to the dopes cast onto the metal support. The peelable laminated film was formed, peeled off and then fixed with pins at both ends. While keeping a constant length between the pins, the film was dried in dry air at 105° C. for 5 minutes. After the pins were removed, the film was further dried at 130° C. for 20 minutes. The resulting laminated film was reeled.

Next, the thin film of the upper layer was peeled off from the lower layer, thereby obtaining each of cellulose acylate films (TAC-1) to (TAC-4) having a thickness shown in Table 1 below.

TABLE 1

| Protective layer | Upper layer | | Lower layer | | Thickness of cellulose acylate film (µm) |
|---|---|---|---|---|---|
| | Dope | Thickness (µm) | Dope | Thickness (µm) | |
| TAC-1 | — | — | T1 | 40 | 40 |
| TAC-2 | P1 | 25 | T1 | 25 | 25 |
| TAC-3 | P1 | 35 | T1 | 10 | 10 |
| TAC-4 | P1 | 35 | T1 | 5 | 5 |

<Formation of Acrylic Polymer Film (Acryl-1)>

41.5 parts by mass of methyl methacrylate (MMA), 6 parts by mass of methyl 2-(hydroxymethyl)acrylate (MHMA), 2.5 parts by mass of 2-[2'-hydroxy-5'-methacryloyloxy]ethylphenyl]-2H-benzotriazole (trade name: RUVA-93, manufactured by Otsuka Chemical Co., Ltd.), 50 parts by mass of toluene as a polymerization solvent, 0.025 parts by mass of an antioxidant (ADEKA STAB 2112 manufactured by Asahi Denka Kogyo K.K.), and 0.025 parts by mass of n-dodecyl mercaptan as a chain transfer agent were put into a reaction tank having an internal volume of 30 L equipped with a stirrer, a temperature sensor, a cooling tube, and a nitrogen introducing tube, and the temperature was increased to 105° C. while nitrogen was passed therethrough.

When reflux accompanied by an increase in temperature starts, 0.05 parts by mass of t-amylperoxyisononanoate (trade name: Luperox 570 manufactured by ARKEMA YOSHITOMI, LTD.) as a polymerization initiator was added thereto, and 0.10 parts by mass of t-amylperoxyisononanoate was added dropwise for 3 hours so that the mixture was subjected to solution polymerization under reflux at about 105° C. to 110° C., and then the mixture was also aged for 4 hours, Subsequently, the polymerization solution obtained was subjected to cyclocondensation reaction under reflux at about 90° C. to 110° C. for 2 hours by adding 0.05 parts by mass of 2-ethythexyl phosphate (Phoslex A-8 manufactured by Sakai Chemical Industry Co., Ltd.) as a catalyst (cyclization catalyst) of cyclocondensation reaction thereto, and then was further subjected cyclocondensation reaction by heating the polymerization solution for 30 minutes by an autoclave at 40° C.

Subsequently, 0.94 parts by mass of CGL777MPA (manufactured by Ciba Specialty Chemicals Inc.) was mixed as a UV absorbing agent with the polymerization solution after the reaction proceeded.

Subsequently, the obtained polymer solution was introduced into a vent type screw biaxial extruder (screw diameter ϕ=50.0 mm, effective length L/D=30), which had a barrel temperature of 240° C., a rotation speed of 100 rpm, and a decompression degree from 13.3 hPa to 400 hPa (from 10 mmHg to 300 mmHg) and was equipped with one rear vent, four fore vents (referred to first, second, third, and fourth vents from the upstream side), and a leaf disk-type polymer filter (filtration accuracy: 5 µm, filtration area: 1.5 m²) disposed at a distal end portion thereof, at a processing rate of 45 kg/h in terms of the resin amount, and was subjected to devolatilization. At that time, a separately prepared mixed solution of an antioxidant and a cyclization catalyst deactivator was introduced thereinto at an introduction rate of 0.68 kg/h after the first vent, and ion-exchanged water was introduced thereinto at an introduction rate of 0.22 kg/h after the third vent.

As the mixed solution of an antioxidant and a cyclization catalyst deactivator, a solution obtained by dissolving 50 parts by mass of an antioxidant (SUMILIZER GS, manufactured by Sumitomo Chemical Industry Co., Ltd.) and 35 parts by mass of zinc octylate as the deactivator (3.6% Nikka Octhix Zinc manufactured by NIHON KAGAKU SANGYO Co., Ltd.) in 200 parts by mass of toluene was used.

Subsequently, after the devolatilization was completed, the thermally melted resin remaining in the extruder was extruded from the distal end of the extruder while being accompanied by the filtration of the polymer filter, and then pelletized by a pelletizer, and a pellet of a transparent resin composition including an acrylic resin having a lactone ring structure in the main chain thereof and a UV absorbing agent was obtained. The weight average molecular weight of the resin was 145,000, and the glass transition temperature (Tg) of the resin and the resin composition was 122° C.

The prepared pellet of the resin composition including an acrylic resin having a lactone ring structure in the main chain thereof and a UV absorbing agent was melted and extruded from a coat hanger type T-die using a biaxial extruder to obtain an acrylic polymer film having a thickness of 40 µm (Acryl-1).

<Formation of Acrylic Polymer Film (Acryl-2)>

An acrylic polymer film having a thickness of 20 µm (Acryl-2) was obtained in the same manner as in the preparation of the acrylic polymer film (Acryl-1) except that the thickness was changed to 20 µm by melting extrusion.

(2) Formation of Hard Coat Layer

<Preparation of Coating Solution for Hard Coat Layer (HC-1)>

A coating solution for hard coat layer (HC-1) was prepared by mixing each component at the composition shown below and filtering the composition with a polypropylene filter having a pore size of 30 µm.

Composition of Coating Solution for Hard Coat Layer (HC-1)

DPHA (binder): 22.9 parts by mass
PET30 (binder): 22.9 parts by mass
Irgacure 184 (polymerization initiator): 1.5 parts by mass
MEK (solvent): 45.2 parts by mass
FP-13 (leveling agent): 0.1 parts by mass Compounds used in the composition of the coating solution for hard coat layer (HC-1) are shown below.
DPHA: Mixture of dipentaerythritol hexaacrylate and dipentaerythritol pentaacrylate (manufactured by Nippon Kayaku Co., Ltd.)
PET30: Mixture of pentaerythritol triacrylate and pentaerythritol tetraacrylate manufactured by Nippon Kayaku Co., Ltd.)
Irgacure 184: Polymerization initiator (manufactured by BASF)
FP-13: Fluorine surfactant described in the paragraph "0341" of JP2009-063983A <Preparation of Coating Solutions for Hard Coat Layer (HC-2) (HC-11)>

Coating solutions for a hard coat layer (HC-2) to (HC-11) were prepared in the same manner as in the preparation of the coating solution for hard coat layer (HC-1) by mixing each component shown in Table 2 at the composition shown in Table 2 below and filtering the composition with a polypropylene filter having a pore size of 30 μm.

TABLE 2

| Hard coat layer | Polymerizable monomer | Polymerization initiator | Solvent |
|---|---|---|---|
| HC-1 | PET30/DPHA = 50/50 | Irgacure 184 | MEK |
| HC-2 | PET30/DPHA = 50/50 | Irgacure 184 | MEK/Methyl acetate = 50/50 |
| HC-3 | PET30/DPHA = 50/50 | Irgacure 184 | Methyl acetate |
| HC-4 | PET30/DPHA = 50/50 | Irgacure 184 | Methyl acetate/ Toluene = 50/50 |
| HC-5 | PET30/DPHA = 50/50 | Irgacure 184 | MEK/ MIBK = 50/50 |
| HC-6 | PET30/DPHA = 50/50 | Irgacure 127 | MEK |
| HC-7 | DPHA/DPHA-40H = 50/50 | Irgacure 184 | MEK |
| HC-8 | PET30/BISCOAT 360 = 50/50 | Irgacure 184 | MEK |
| HC-9 | DPHA/4-Hydroxybutyl acrylate = 75/25 | Irgacure 184 | MEK |
| HC-10 | PET30/DPHA-50/50 | Irgacure 184 | Toluene |
| HC-11 | PET30/DPHA-50/50 | Irgacure 184 | MEK/ n-Butanol = 40/60 |

In Table 2 shown above, compounds different from the composition used for the coating solution for hard coat layer (HC-1) are shown below.
DPHA-40H: Reaction product of DPHA and hexamethylenediisocyanate (manufactured by Nippon Kayaku Co., Ltd.)
Biscoat 360: Trimethylolpropane PO-modified triacrylate (manufactured by Osaka Organic Chemical Industry Ltd.)
4-Hydroxybutyl acrylate (Nippon Kasei Chemical Co., Ltd.)
Irgacure 127: Polymerization initiator (manufactured by BASF)

<Formation of Hard Coat Layer>

Each of the cellulose acylate films (TAC-1) to (TAC-4) or the acrylic polymer films (Acryl-1) and (Acryl-2) shown in Tables 3 and 4 below was used as a support and each of the coating solutions for a hard coat layer (HC-1) to (HC-11) shown in Tables 3 and 4 below was applied to the support by a die coating method such that the coating thickness was set to the coating thickness shown in Tables 3 and 4 below.

Next, after the coating solution was dried at room temperature for 120 seconds and further dried at 60° C. for 150 seconds, the coating layer was cured upon irradiation with ultraviolet rays having a radiation illuminance of 400 mW/cm$^2$ and an irradiation dose of 150 mJ/cm$^2$ by using an air-cooled metal halide lamp (manufactured by Eyegraphics Co., Ltd.) of 160 W/cm under purging with nitrogen (oxygen concentration: 0.5% or less), thereby forming a hard coat layer.

Here, any of the coating solvents in the coating solutions for a hard coat layer used in Examples made the surface of the cellulose acylate films or the acrylic polymer films dissolve and a part of or the entirety of the cellulose acylate films or the acrylic polymer films was formed as a mixed layer.

<Preparation of Coating Solution for Antiglare Layer (AG-1)>

A coating solution for antiglare layer (AG-1) was prepared by preparing each component at the composition below and filtering the composition with a polypropylene filter having a pore size of 30 μm.

In Examples 21, 22 and 25, after the hard coat layer was formed, the coating solution for antiglare layer (AG-1) was applied by a die coating method so as to have a coating thickness of 5 μm.

Next, after the coating solution was dried at 60° C. for 150 seconds, the coating layer was cured upon irradiation with ultraviolet rays having a radiation illuminance of 400 mW/cm$^2$ and an irradiation dose of 150 ml/cm$^2$ by using an air-cooled metal halide lamp (manufactured by Eyegraphics Co., Ltd.) of 160 W/cm under purging with nitrogen (oxygen concentration: 0.5% or less), thereby forming an antiglare layer having a thickness of 5 μm.

Composition of Coating Solution for Antiglare Layer AG-1
PET30: 50.9 parts by mass
Biscoat 360: 30.5 parts by mass
Irgacure 127: 3.2 parts by mass
Acryl particle dispersion liquid (30%): 21.5 parts by mass
FP-13: 0.1 parts by mass
MIBK (solvent): 21.8 parts by mass
MEK (solvent): 34.7 parts by mass The compounds used in the composition of the coating solution for antiglare layer (AG-1) are shown below.
PET30: Mixture of pentaerythritol triacrylate and pentaerythritol tetraacrylate (manufactured by Nippon Kayaku Co., Ltd.)
Biscoat 360: Trimethylolpropane PO-modified triacrylate (manufactured by Osaka Organic Chemical Industry Ltd.)
Irgacure 127: Polymerization initiator (manufactured by BASF)
Acryl particle dispersion liquid: Techpolymer (manufactured by Sekisui Plastics Co., Ltd.)
FP-13: Fluorine surfactant described in the paragraph "0341" of JP2009-063983A (3) Preparation of Polarizing Plate
<Cellulose Acylate Film Saponification Treatment>

The cellulose acylate film in which the hard coat layer prepared above is formed in the case in which the antiglare layer is provided, the antiglare layer is formed) was immersed in 2.3 mol/L of an aqueous sodium hydroxide solution at 55° C. for 3 minutes.

Next, the film was washed with water in a washing bath at room temperature and neutralized with 0.05 mol/L of sulfuric acid at 30° C. Thereafter, the film was washed again with water in the washing bath at room temperature and further dried with hot air at 100° C.

In this manner, the surface of the cellulose acylate film was subjected to a saponification treatment.

<Preparation of Polarizing Plate Using Cellulose Acylate Film>

A polarizer was prepared by adsorbing iodine to a stretched polyvinyl alcohol film.

First, the cellulose acylate film which had been subjected to a saponification treatment was attached to one surface of the polarizer using a polynivyl alcohol adhesive. At this time, the polarizer and the cellulose acylate film were arranged such that the transmission axis of the polarizer was parallel to the slow axis of the cellulose acylate film.

<Preparation of Polarizing Plate Using Acrylic Polymer Film>

In the above-prepared acrylic polymer film in which the hard coat layer was formed, the surface on which the hard coat layer was not provided was attached to one surface of the polarizer prepared above using the following epoxy adhesive composition. At this time, the polarizer and the acrylic polymer film were arranged such that, such that the transmission axis of the polarizer was parallel to the slow axis of the acrylic polymer film.

<Epoxy Adhesive Composition>

3,4-epoxycyclohexylmethyl-3,4-epoxycyclohexanecarboxylate: 40 parts by mass
Bisphenol A type epoxy resin: 60 parts by mass
Diphenyl[4-(phenylthio)phenyl]sulfonium hexafluoroantimonate (cationic polymerization initiator): 4.0 parts by mass
Benzoin methyl ether (photosensitizer): 1.0 parts by mass <Attachment of Pressure Sensitive Adhesive Layer>

After the cellulose acylate film or the acrylic polymer film was attached to the one surface of the polarizer, a pressure sensitive adhesive A or B shown in Tables 3 and 4 below was applied to the surface of the polarizer opposite to the surface to which the cellulose acylate film or the acrylic polymer film was attached, thereby preparing a polarizing plate.

(Pressure Sensitive Adhesive A)

A sheet-like pressure sensitive adhesive in which a pressure sensitive adhesive layer formed by adding a urethane acrylate oligomer and an isocyanate crosslinking agent to a copolymer of butyl acrylate and acrylic acid was formed on a peeled surface of a polyethylene terephthalate film (separator) which had been subjected to a peeling treatment so as to have a thickness of 5 μm was used. When the storage elastic modulus of the pressure sensitive adhesive A was measured in the above-described method, the storage elastic modulus of the pressure sensitive adhesive A was 0.50 MPa at 23° C.

(Pressure Sensitive Adhesive B)

A sheet-like pressure sensitive adhesive with a separator film formed by applying an organic solvent solution formed by adding an isocyanate crosslinking agent to a copolymer of butyl acrylate and acrylic acid to a peeled surface of a polyethylene terephthalate film (separator film) having a thickness of 38 μm which had been subjected to a peeling treatment by a die coater so as to have a thickness of 15 μm after drying was used. When the storage elastic modulus of the pressure sensitive adhesive B was measured in the above-described method, the storage elastic modulus of the pressure sensitive adhesive B was 0.05 MPa at 23° C.

Example 23

A polarizing plate was prepared in the same manner as in Example 4 except that a hard coat layer was provided between the polarizer and the pressure sensitive adhesive layer using the coating solution for hard coat layer (HC-1) under the same conditions as in Example 1.

Example 24

A polarizing plate was prepared in the same manner as in Example 8 except that a hard coat layer was provided between the polarizer and the pressure sensitive adhesive layer using the coating solution for hard coat layer (HC-1) under the same conditions as in Example 1.

Example 25

A polarizing plate was prepared in the same manner as in Example 21 except that a hard coat layer was provided between the polarizer and the pressure sensitive adhesive layer using the coating solution the hard coat layer (HC-1) under the same conditions as in Example 1.

Comparative Example 15

A polarizing plate was prepared in the same manner as in Comparative Example 4 except that a hard coat layer was provided between the polarizer and the pressure sensitive adhesive layer using the coating solution for hard coat layer (HC-1) under the same conditions as in Example 1.

Comparative Example 16

A polarizing plate was pre pared in the same manner as in Comparative Example 10 except that a hard coat layer was provided between the polarizer and the pressure sensitive adhesive layer using the coating solution for hard coat layer (HC-1) under the same conditions as in Example 1.

Comparative Example 17

A polarizing plate was prepared in the same manner as in Comparative Example 14 except that a hard coat layer was provided between the polarizer and the pressure sensitive adhesive layer using the coating solution the hard coat layer (HC-1) under the same conditions as in Example 1.

TABLE 3

| | Protective layer | | Hard coat layer (outer side) | | | | Antiglare layer | | Hard coat layer (inner side) | | Pressure sensitive adhesive layer |
|---|---|---|---|---|---|---|---|---|---|---|---|
| | Formulation | Thickness (μm) | Formulation | Coating solvent | Coating thickness* (μm) | Drying time at room temperature (sec) | Formulation | Thickness (μm) | Formulation | Coating thickness (μm) | Pressure sensitive adhesive |
| Example 1 | TAC-1 | 40 | HC-1 | MEK | 10 | 120 | — | — | — | — | A |
| Example 2 | TAC-2 | 25 | HC-1 | MEK | 10 | 60 | — | — | — | — | A |
| Example 3 | TAC-2 | 25 | HC-1 | MEK | 10 | 120 | — | — | — | — | A |

TABLE 3-continued

|  | Protective layer | | Hard coat layer (outer side) | | | | Antiglare layer | | Hard coat layer (inner side) | | Pressure sensitive adhesive layer |
|---|---|---|---|---|---|---|---|---|---|---|---|
|  | Formu-lation | Thick-ness (μm) | Formu-lation | Coating solvent | Coating thickness* (μm) | Drying time at room temperature (sec) | Formu-lation | Thick-ness (μm) | Formu-lation | Coating thickness (μm) | Pressure sensitive adhesive |
| Example 4 | TAC-3 | 10 | HC-1 | MEK | 10 | 60 | — | — | — | — | A |
| Example 5 | TAC-3 | 10 | HC-1 | MEK | 15 | 60 | — | — | — | — | A |
| Example 6 | TAC-3 | 10 | HC-1 | MEK | 10 | 120 | — | — | — | — | A |
| Example 7 | TAC-4 | 5 | HC-1 | MEK | 10 | 60 | — | — | — | — | A |
| Example 8 | TAC-4 | 5 | HC-1 | MEK | 5 | 120 | — | — | — | — | A |
| Example 9 | TAC-3 | 10 | HC-2 | MEK/Methyl acetate | 10 | 60 | — | — | — | — | A |
| Example 10 | TAC-4 | 5 | HC-2 | MEK/Methyl acetate | 10 | 60 | — | — | — | — | A |
| Example 11 | TAC-3 | 10 | HC-3 | Methyl acetate | 10 | 60 | — | — | — | — | A |
| Example 12 | TAC-4 | 5 | HC-3 | Methyl acetate | 10 | 60 | — | — | — | — | A |
| Example 13 | TAC-3 | 10 | HC-4 | Methyl acetate/Toluene | 10 | 120 | — | — | — | — | A |
| Example 14 | TAC-4 | 5 | HC-4 | Methyl acetate/Toluene | 10 | 120 | — | — | — | — | A |
| Example 15 | TAC-3 | 10 | HC-5 | MEK/MIBK | 10 | 120 | — | — | — | — | A |
| Example 16 | TAC-4 | 5 | HC-5 | MEK/MIBK | 10 | 120 | — | — | — | — | A |
| Example 17 | TAC-3 | 10 | HC-6 | MEK | 10 | 60 | — | — | — | — | A |
| Example 18 | TAC-3 | 10 | HC-7 | MEK | 10 | 60 | — | — | — | — | A |
| Example 19 | TAC-3 | 10 | HC-8 | MEK | 10 | 60 | — | — | — | — | A |
| Example 20 | TAC-3 | 10 | HC-9 | MEK | 10 | 60 | — | — | — | — | A |
| Example 21 | TAC-3 | 10 | HC-1 | MEK | 10 | 60 | AG-1 | 5 | — | — | A |
| Example 22 | TAC-4 | 5 | HC-1 | MEK | 5 | 120 | AG-1 | 5 | — | — | A |
| Example 23 | TAC-3 | 10 | HC-1 | MEK | 10 | 60 | — | — | HC-1 | 10 | A |
| Example 24 | TAC-4 | 5 | HC-1 | MEK | 5 | 120 | — | — | HC-1 | 10 | A |
| Example 25 | TAC-3 | 10 | HC-1 | MEK | 10 | 60 | AG-1 | 5 | HC-1 | 10 | A |
| Example 26 | Acryl-1 | 40 | HC-1 | MEK | 8 | 60 | — | — | — | — | A |
| Example 27 | Acryl-1 | 40 | HC-1 | MEK | 8 | 90 | — | — | — | — | A |
| Example 28 | Acryl-1 | 40 | HC-1 | MEK | 8 | 120 | — | — | — | — | A |
| Example 29 | Acryl-2 | 20 | HC-1 | MEK | 8 | 60 | — | — | — | — | A |
| Example 30 | Acryl-2 | 20 | HC-1 | MEK | 15 | 60 | — | — | — | — | A |
| Example 31 | Acryl-1 | 40 | HC-2 | MEK/Methyl acetate | 8 | 60 | — | — | — | — | A |
| Example 32 | Acryl-1 | 40 | HC-3 | Methyl acetate | 8 | 60 | — | — | — | — | A |
| Example 33 | Acryl-1 | 40 | HC-4 | Methyl acetate/Toluene | 8 | 60 | — | — | — | — | A |
| Example 34 | Acryl-1 | 40 | HC-5 | MEK/MIBK | 8 | 60 | — | — | — | — | A |
| Example 35 | Acryl-1 | 40 | HC-10 | Toluene | 8 | 60 | — | — | — | — | A |

Coating thickness*: Total thickness of hard coat layer + mixed layer

TABLE 4

|  | Protective layer | | Hard coat layer (outer side) | | | | Antiglare layer | | Hard coat layer (inner side) | | Pressure sensitive adhesive layer |
|---|---|---|---|---|---|---|---|---|---|---|---|
|  | Formu-lation | Thick-ness (μM) | Formu-lation | Coating solvent | Coating thickness* (μm) | Drying time at room temperature (sec) | Formu-lation | Thick-ness (μm) | Formu-lation | Coating thickness (μm) | Pressure sensitive adhesive |
| Comparative Example 1 | TAC-1 | 40 | HC-1 | MEK | 10 | 120 | — | — | — | — | B |
| Comparative Example 2 | TAC-2 | 25 | HC-1 | MEK | 10 | 60 | — | — | — | — | B |
| Comparative Example 3 | TAC-3 | 10 | HC-1 | MEK | 10 | 60 | — | — | — | — | B |
| Comparative Example 4 | TAC-4 | 5 | HC-1 | MEK | 10 | 60 | — | — | — | — | B |
| Comparative Example 5 | TAC-1 | 40 | HC-3 | Methyl acetate | 10 | 120 | — | — | — | — | B |
| Comparative Example 6 | TAC-1 | 40 | HC-10 | Toluene | 10 | 60 | — | — | — | — | A |
| Comparative Example 7 | TAC-1 | 40 | HC-10 | Toluene | 3 | 60 | — | — | — | — | A |

TABLE 4-continued

| | Protective layer | | Hard coat layer (outer side) | | | | Antiglare layer | | Hard coat layer (inner side) | | Pressure sensitive adhesive layer |
|---|---|---|---|---|---|---|---|---|---|---|---|
| | Formulation | Thickness (μM) | Formulation | Coating solvent | Coating thickness* (μm) | Drying time at room temperature (sec) | Formulation | Thickness (μm) | Formulation | Coating thickness (μm) | Pressure sensitive adhesive |
| Comparative Example 8 | TAC-2 | 25 | HC-10 | Toluene | 10 | 60 | — | — | — | — | A |
| Comparative Example 9 | TAC-3 | 10 | HC-10 | Toluene | 10 | 60 | — | — | — | — | A |
| Comparative Example 10 | TAC-4 | 5 | HC-10 | Toluene | 10 | 60 | — | — | — | — | A |
| Comparative Example 11 | TAC-1 | 40 | HC-10 | Toluene | 10 | 60 | — | — | — | — | B |
| Comparative Example 12 | TAC-2 | 25 | HC-10 | Toluene | 10 | 60 | — | — | — | — | B |
| Comparative Example 13 | TAC-3 | 10 | HC-10 | Toluene | 10 | 60 | — | — | — | — | B |
| Comparative Example 14 | TAC-4 | 5 | HC-10 | Toluene | 10 | 60 | — | — | — | — | B |
| Comparative Example 15 | TAC-4 | 5 | HC-1 | MEK | 10 | 60 | — | — | HC-1 | 10 | B |
| Comparative Example 16 | TAC-4 | 5 | HC-10 | Toluene | 10 | 60 | — | — | HC-1 | 10 | A |
| Comparative Example 17 | TAC-4 | 5 | HC-10 | Toluene | 10 | 60 | — | — | HC-1 | 10 | B |
| Comparative Example 18 | Acryl-1 | 40 | HC-1 | MEK | 8 | 60 | — | — | — | — | B |
| Comparative Example 19 | Acryl-1 | 40 | HC-1 | MEK | 8 | 90 | — | — | — | — | B |
| Comparative Example 20 | Acryl-1 | 40 | HC-1 | MEK | 8 | 120 | — | — | — | — | B |
| Comparative Example 21 | Acryl-2 | 20 | HC-1 | MEK | 8 | 60 | — | — | — | — | B |
| Comparative Example 22 | Acryl-1 | 40 | HC-11 | MEK/n-Butanol | 8 | 60 | — | — | — | — | A |
| Comparative Example 23 | Acryl-2 | 20 | HC-11 | MEK/n-Butanol | 8 | 60 | — | — | — | — | A |
| Comparative Example 24 | Acryl-1 | 40 | HC-11 | MEK/n-Butanol | 8 | 60 | — | — | — | — | B |
| Comparative Example 25 | Acryl-2 | 20 | HC-11 | MEK/n-Butanol | 8 | 60 | — | — | — | — | B |

Coating thickness*: Total thickness of hard coat layer + mixed layer

<Hardness Difference (X)>

The hardness of the outer side layer of each prepared polarizing plate in a depth direction was measured in the following manner.

First, the outer side layer of the polarizing plate was cut using a microtome in the depth direction to expose the cross section.

Next, the depth of impression (hardness) that could be confirmed when, using an AFM (SPA400, manufactured by SII Nanotechnology) with a Bercovici indenter made of diamond, the Bercovici indenter was pressed against the cross section with a load of 400 N/m at intervals of 1.5 μm in the depth direction, and then the Bercovici indenter was pulled out was measured.

<Hardness Difference (Y)>

In the outer side layer of each prepared polarizing plate, the hardness of the surface A (the surface of the hard coat layer or the antiglare layer) and the surface B (an interface between the protective layer and the polarizer) was measured in the following manner.

(Surface A)

The depth of impression (hardness) that could be confirmed when, using an AFM (SPA400, manufactured by SII Nanotechnology) with a Bercovici indenter made of diamond, the Bercovici indenter was pressed against the cross section with a load of 400 N/m, and then Bercovici indenter was pulled out was measured.

(Surface B)

After the protective layer was peeled off from the polarizer in each prepared polarizing plate and the surface of the protective layer (surface B) was exposed, the hardness was measured in the same manner as in the hardness measurement of the surface A.

<Hardness Difference Ratio (X/Y)>

A ratio (X/Y) between each value of the hardness difference (X) (each value of the hardness in the depth direction) and the hardness difference (Y) was calculated.

Here, regarding the hardness difference ratio (X/Y) in Tables 5 and 6 below, as a representative value thereof, a ratio between the maximum value of each value of the hardness difference (X) and the hardness difference (Y), that is, the maximum value of the ratio (X/Y) is shown.

<Hardness Evaluation>

The hardness of each prepared polarizing plate was evaluated based on the scratch hardness (pencil test) described in JIS K5400-5-4.

Specifically, the polarizing plate was humidified at a temperature of 25° C. and a humidity of 60% RH for 2 hours and then the test was carried out 20 times respectively using 2H and 3H pencils for test defined in JIS S6006 with a load of 500 g. Thus, evaluation was made based on determination criteria as follows.

The testing direction of the pencil (scratch direction) was set to be parallel to the transport direction (longitudinal direction) at the time of forming the protective layer (cellulose acylate film) or the application direction of the hard coat layer.

(Hardness Determination Criteria)
A: The number of scratches is 0 or more and 3 or less during 20 tests.
B: The number of scratches is 4 or more and 6 or less during 20 tests.
C: The number of scratches is 7 or more during 20 tests.
(Evaluation Criteria)

5: The hardness is determined as a level of "A" in the 2H test and the 3H test.
4: The hardness is determined as a level of "A" in the 2H test and the hardness is determined as a level of "B" in the 3H test.
3: "The hardness is determined as a level of "A" in the 2H test and the hardness is determined as a level of "C" in the 3H test" or "The hardness is determined as a level of "B" in the 2H test and the 3H test".
2: The hardness is determined as a level of "B" in the 2H test and the hardness is determined as a level of "C" in the 3H test.
1: The hardness is determined as a level of "C" in the 2H test and the 3H test.

TABLE 5

| | Thickness of outer side layer (μm) | | | | | Pressure sensitive adhesive layer | Maximum value of | |
| --- | --- | --- | --- | --- | --- | --- | --- | --- |
| | Protective layer* | Mixed layer | Hard coat layer | Antiglare layer | Total | Storage elastic modulus (MPa) | hardness difference ratio (X/Y) | Pencil hardness |
| Example 1 | 33 | 7 | 3 | 0 | 43 | 0.50 | 0.2 | 5 |
| Example 2 | 20 | 5 | 5 | 0 | 30 | 0.50 | 0.3 | 4 |
| Example 3 | 18 | 7 | 3 | 0 | 28 | 0.50 | 0.2 | 5 |
| Example 4 | 5 | 5 | 5 | 0 | 15 | 0.50 | 0.3 | 4 |
| Example 5 | 5 | 5 | 10 | 0 | 20 | 0.50 | 0.3 | 4 |
| Example 6 | 3 | 7 | 3 | 0 | 13 | 0.50 | 0.2 | 4 |
| Example 7 | 0 | 5 | 5 | 0 | 10 | 0.50 | 0.3 | 4 |
| Example 8 | 0 | 5 | 0 | 0 | 5 | 0.50 | 0.4 | 4 |
| Example 9 | 5 | 5 | 5 | 0 | 15 | 0.50 | 0.3 | 4 |
| Example 10 | 0 | 5 | 5 | 0 | 10 | 0.50 | 0.4 | 4 |
| Example 11 | 5 | 5 | 5 | 0 | 15 | 0.50 | 0.3 | 4 |
| Example 12 | 0 | 5 | 5 | 0 | 10 | 0.50 | 0.4 | 4 |
| Example 13 | 5 | 5 | 5 | 0 | 15 | 0.50 | 0.3 | 4 |
| Example 14 | 0 | 5 | 5 | 0 | 10 | 0.50 | 0.4 | 4 |
| Example 15 | 5 | 5 | 5 | 0 | 15 | 0.50 | 0.3 | 4 |
| Example 16 | 0 | 5 | 5 | 0 | 10 | 0.50 | 0.4 | 4 |
| Example 17 | 5 | 5 | 5 | 0 | 15 | 0.50 | 0.3 | 4 |
| Example 18 | 5 | 5 | 5 | 0 | 15 | 0.50 | 0.3 | 4 |
| Example 19 | 5 | 5 | 5 | 0 | 15 | 0.50 | 0.3 | 4 |
| Example 20 | 5 | 5 | 5 | 0 | 15 | 0.50 | 0.3 | 4 |
| Example 21 | 5 | 5 | 5 | 5 | 20 | 0.50 | 0.3 | 4 |
| Example 22 | 0 | 5 | 0 | 5 | 10 | 0.50 | 0.4 | 4 |
| Example 23 | 5 | 5 | 5 | 0 | 15 | 0.50 | 0.3 | 4 |
| Example 24 | 0 | 5 | 0 | 0 | 5 | 0.50 | 0.4 | 4 |
| Example 25 | 5 | 5 | 5 | 5 | 20 | 0.50 | 0.3 | 4 |
| Example 26 | 36 | 4 | 4 | 0 | 44 | 0.50 | 0.3 | 4 |
| Example 27 | 34 | 6 | 2 | 0 | 42 | 0.50 | 0.2 | 4 |
| Example 28 | 33 | 7 | 1 | 0 | 41 | 0.50 | 0.2 | 4 |
| Example 29 | 16 | 4 | 4 | 0 | 24 | 0.50 | 0.3 | 4 |
| Example 30 | 16 | 4 | 11 | 0 | 31 | 0.50 | 0.3 | 4 |
| Example 31 | 36 | 4 | 4 | 0 | 44 | 0.50 | 0.3 | 4 |
| Example 32 | 36 | 4 | 4 | 0 | 44 | 0.50 | 0.3 | 4 |
| Example 33 | 36 | 4 | 4 | 0 | 44 | 0.50 | 0.3 | 4 |
| Example 34 | 36 | 4 | 4 | 0 | 44 | 0.50 | 0.3 | 4 |
| Example 35 | 36 | 4 | 4 | 0 | 44 | 0.50 | 0.3 | 4 |

Protective layer*: Thickness obtained by subtracting thickness of mixed layer from thickness of TAC 1 to 4 or Acryl-1 or Acryl-2

TABLE 6

| | Thickness of outer side layer (μm) | | | | | Pressure sensitive adhesive layer | Maximum value of | |
| --- | --- | --- | --- | --- | --- | --- | --- | --- |
| | Protective layer* | Mixed layer | Hard coat layer | Antiglare layer | Total | Storage elastic modulus (MPa) | hardness difference ratio (X/Y) | Pencil hardness |
| Comparative Example 1 | 35 | 5 | 5 | 0 | 45 | 0.05 | 0.3 | 3 |
| Comparative Example 2 | 20 | 5 | 5 | 0 | 30 | 0.05 | 0.3 | 2 |
| Comparative Example 3 | 5 | 5 | 5 | 0 | 15 | 0.05 | 0.3 | 1 |

TABLE 6-continued

| | Thickness of outer side layer (μm) | | | | | Pressure sensitive adhesive layer | Maximum value of | |
| --- | --- | --- | --- | --- | --- | --- | --- | --- |
| | Protective layer* | Mixed layer | Hard coat layer | Antiglare layer | Total | Storage elastic modulus (MPa) | hardness difference ratio (X/Y) | Pencil hardness |
| Comparative Example 4 | 0 | 5 | 5 | 0 | 10 | 0.05 | 0.4 | 1 |
| Comparative Example 5 | 35 | 5 | 5 | 0 | 45 | 0.05 | 0.3 | 3 |
| Comparative Example 6 | 40 | 0 | 10 | 0 | 50 | 0.50 | 1.1 | 3 |
| Comparative Example 7 | 40 | 0 | 3 | 0 | 43 | 0.50 | 1.0 | 2 |
| Comparative Example 8 | 25 | 0 | 10 | 0 | 35 | 0.50 | 1.0 | 2 |
| Comparative Example 9 | 10 | 0 | 10 | 0 | 20 | 0.50 | 1.1 | 1 |
| Comparative Example 10 | 5 | 0 | 10 | 0 | 15 | 0.50 | 1.0 | 1 |
| Comparative Example 11 | 40 | 0 | 10 | 0 | 50 | 0.05 | 1.0 | 2 |
| Comparative Example 12 | 25 | 0 | 10 | 0 | 35 | 0.05 | 1.0 | 1 |
| Comparative Example 13 | 10 | 0 | 10 | 0 | 20 | 0.05 | 1.0 | 1 |
| Comparative Example 14 | 5 | 0 | 10 | 0 | 15 | 0.05 | 1.1 | 1 |
| Comparative Example 15 | 0 | 5 | 5 | 0 | 10 | 0.05 | 0.4 | 1 |
| Comparative Example 16 | 5 | 0 | 10 | 0 | 15 | 0.50 | 1.0 | 1 |
| Comparative Example 17 | 5 | 0 | 10 | 0 | 15 | 0.05 | 1.0 | 1 |
| Comparative Example 18 | 36 | 4 | 4 | 0 | 44 | 0.05 | 0.3 | 1 |
| Comparative Example 19 | 34 | 6 | 2 | 0 | 42 | 0.05 | 0.2 | 2 |
| Comparative Example 20 | 33 | 7 | 1 | 0 | 41 | 0.05 | 0.2 | 2 |
| Comparative Example 21 | 16 | 4 | 4 | 0 | 24 | 0.05 | 0.3 | 1 |
| Comparative Example 22 | 40 | 0 | 10 | 0 | 50 | 0.50 | 1.1 | 2 |
| Comparative Example 23 | 20 | 0 | 10 | 0 | 30 | 0.50 | 1.0 | 2 |
| Comparative Example 24 | 40 | 0 | 10 | 0 | 50 | 0.05 | 1.0 | 1 |
| Comparative Example 25 | 20 | 0 | 10 | 0 | 30 | 0.05 | 1.0 | 1 |

Protective layer*: Thickness obtained by subtracting thickness of mixed layer from thickness of TAC 1 to 4 or Acryl-1 or Acryl-2

From the results shown in Tables 1 to 6, it has been found that in both the case in which the storage elastic modulus is decreased after laminating the pressure sensitive adhesive layer and the case in which the mixed layer is not provided between the hard coat layer and the protective layer and the maximum value of the hardness difference ratio (X/Y) of the outer side layer is 1 or more, that is, the case in which the relationship of the ratio (X/Y)<1 is not satisfied, the hardness of the polarizing plate is deteriorated (Comparative Examples 1 to 25).

In contrast, it has been found that in both the case in which the outer side layer of the polarizing plate is a thin film having a thickness of more than 3 μm and equal to or less than 45 μm and the case in which a pressure sensitive adhesive layer whose storage elastic modulus after lamination is in a specific range to provide a mixed layer of the constituent material of the hard coat layer and the constituent material of the protective layer and the maximum value of the hardness difference ratio (X/Y) of the outer side layer is less than 1, that is, the case in which the relationship of the ratio (X/Y)<1 is satisfied, the hardness of the polarizing plate is increased (Examples 1 to 35).

EXPLANATION OF REFERENCES

1: pressure sensitive adhesive layer
2: polarizer
3: outer side layer
4: hard coat layer
5: protective layer
6: mixed layer
10: polarizing plate
11: liquid crystal cell
20: liquid crystal display device

What is claimed is:
1. A polarizing plate comprising, in the following order:
a pressure sensitive adhesive layer;
a polarizer; and
an outer side layer provided on a visible side rather than on the polarizer side,
wherein the thickness of the outer side layer is more than 3 μm and equal to or less than 45 μm,
the outer side layer includes, in the following order, from the visible side, a hard coat layer and a protective layer, and a mixed layer in which a constituent material of the hard coat layer and a constituent material of the protective layer are mixed is provided between the hard coat layer and the protective layer, the thickness of the mixed layer is equal to or more than the thickness of the hard coat layer, the storage elastic modulus of the pressure sensitive adhesive layer after lamination is 0.1 MPa to 2.0 MPa, and when in the measurement of the hardness of the outer side layer in a depth direction at intervals of 1.5 μm from a surface A of the outer side layer on the opposite side of a side on which the polarizer is provided to a surface B of the outer side layer on a side on which the polarizer is provided, an absolute value of a difference between an n-th measured hardness and an n+1-th measured hardness is defined as a hardness difference X, and an absolute value of a difference between the hardness of the outer side layer at the surface A and the hardness of the outer side layer at the surface B is defined as a hardness difference Y, a ratio between a maximum value of each value of the hardness difference X and the hardness difference Y is 0.05 or more and is smaller than 1, and n represents an integer of 1 or more and the ratio refers to a ratio of the maximum value of each value of the hardness difference X to the hardness difference Y.

2. An image display device comprising:
the polarizing plate according to claim 1; and
a display element.

3. The polarizing plate according to claim 1,
wherein a ratio between the thickness of the protective layer and the thickness of the mixed layer is 2 or more, and
the ratio refers to a ratio of the thickness of the protective layer to the thickness of the mixed layer.

4. An image display device comprising:
the polarizing plate according to claim 3; and
a display element.

5. A polarizing plate comprising, in the following order:
a pressure sensitive adhesive layer;
a polarizer; and
an outer side layer provided on a visible side rather than on the polarizer side, wherein the thickness of the outer side layer is more than 3 μm and equal to or less than 45 μm, wherein the outer side layer is a mixed layer in which a constituent material of a hard coat layer and a constituent material of a protective layer are mixed, the storage elastic modulus of the pressure sensitive adhesive layer after lamination is 0.1 MPa to 2.0 MPa, and when in the measurement of the hardness of the outer side layer in a depth direction at intervals of 1.5 μm from a surface A of the outer side layer on the opposite side of a side on which the polarizer is provided to a surface B of the outer side layer on a side on which the polarizer is provided, an absolute value of a difference between an n-th measured hardness and an n+1-th measured hardness is defined as a hardness difference X, and an absolute value of a difference between the hardness of the outer side layer at the surface A and the hardness of the outer side layer at the surface B is defined as a hardness difference Y, a ratio between a maximum value of each value of the hardness difference X and the hardness difference Y is 0.05 or more and is smaller than 1, and n represents an integer of 1 or more and the ratio refers to a ratio of the maximum value of each value of the hardness difference X to the hardness difference Y.

6. An image display device comprising:
the polarizing plate according to claim 5; and
a display element.

* * * * *